(12) United States Patent
Provost et al.

(10) Patent No.: US 7,034,995 B2
(45) Date of Patent: Apr. 25, 2006

(54) ENHANCED PUMP ABSORBING DOUBLE-CLAD FIBER

(75) Inventors: Lionel Provost, Marcoussis (FR); Christian Simonneau, Antony (FR); Isabelle Bongrand, Cannes (FR); Philippe Bousselet, Leudeville (FR); Christine Moreau, Palaiseau (FR); Dominique Bayart, Clamart (FR); Laurent Gasca, Villebon sur Yvette (FR)

(73) Assignee: ALCATEL, Paris (FR)

( * ) Notice: Subject to any disclaimer, the term of this patent is extended or adjusted under 35 U.S.C. 154(b) by 254 days.

(21) Appl. No.: 10/671,482

(22) Filed: Sep. 29, 2003

(65) Prior Publication Data

US 2004/0085623 A1 May 6, 2004

(30) Foreign Application Priority Data

Oct. 30, 2002 (EP) .................................. 02360303

(51) Int. Cl.
*H01S 3/10* (2006.01)
*H04B 10/12* (2006.01)

(52) U.S. Cl. .................................. 359/341.1
(58) Field of Classification Search ............. 354/341.1; 372/6
See application file for complete search history.

(56) References Cited

U.S. PATENT DOCUMENTS 5,949,941 A 9/1999 DiGiovanni 6,288,835 B1 9/2001 Nilsson et al.
6,819,846 B1 * 11/2004 Mozdy et al. ............. 385/123

FOREIGN PATENT DOCUMENTS

| EP | 001055945 A2 | * | 11/2000 |
| EP | 001128195 A2 | * | 8/2001 |
| JP | 11121839 A | * | 4/1999 |
| WO | WO 02/03510 A1 | | 1/2002 |

OTHER PUBLICATIONS

Nilsson J et al: YB3+-Ring-Doped Fiber for High-Energy Pulse Amplification Optics Letters, Optical Society of America, Washington, US, vol. 22, No. 14, Jul. 15, 1997, pp. 1092-1094, XP000699832.

Ankiewicz A et al.: "Use of Graded Elliptical Cladding for Efficient Pumping of Doped Fiber Cores" Optics Communications, North-Holland Publishing Co. Amsterdam, NL, vol. 133, No. 1/6, 1997, pp. 82-86, XP000641426.

* cited by examiner

*Primary Examiner*—Mark Hellner
(74) *Attorney, Agent, or Firm*—Sughrue Mion, PLLC

(57) ABSTRACT

An optical fiber amplifier is considered comprising a monomode core, a first cladding around said core and at least a further cladding around said first cladding while said first cladding includes a ring shaped active region doped with rare earth material surrounding said mono-mode core. Advantageously, the first cladding is designed with a radial refractive index following an almost continuous decreasing function for increasing radius. The use of a continuously decreasing refractive index for the cladding at the outer border of the ring shaped active medium optimize the efficiency of the coupling between the core and the cladding.

15 Claims, 2 Drawing Sheets

ENHANCED PUMP ABSORBING DOUBLE-CLAD FIBER

TECHNICAL FIELD

The invention relates to an optical fiber amplifier comprising a mono-mode core, a first cladding around said core and at least a further cladding around said first cladding while said first cladding including a ring doped with rare earth material surrounding said mono-mode core. The invention is based on a priority application EP 02 360 303.8 which is hereby incorporated by reference.

BACKGROUND OF THE INVENTION

The tightly confined modal fields of single- or few-moded waveguiding lasers and amplifiers lead to a very strong interaction between any waveguided light and the active medium in the waveguiding core. Therefore, a comparatively small amount of gain medium is sufficient for providing the gain in these devices. Specifically, the gain for a given stored energy, as well as for a given absorbed pump power, is high.

However, this efficient interaction between mode and gain medium can be detrimental. Indeed, in a laser or amplifier, the achievable single-pass gain is limited to some maximum value (e.g. 50 dB). The reason is that at the maximum, a significant fraction of the pump power is converted to amplified spontaneous emission (ASE). A 10 dB higher gain results in approximately 10 dB more ASE. At these gains, the extra pump power required to increase the gain further will be prohibitively high. Since the ASE limits the gain of the device, it also limits the energy stored in the gain media. This in turn obviously limits the amount of energy that a pulse can extract from the device. Consequently, the pulse energy that can be obtained from waveguide lasers and amplifiers is limited.

Furthermore, in optically pumped lasers and amplifiers, it is essential to optimize the interaction between the gain medium and the amplified field or generated signal beam as well as the interaction between the pump beam and the gain medium. However, in typically cladding-pumped lasers and amplifiers, the interaction with the pump beam is significantly smaller than the interaction with the signal beam. Then, for a device that efficiently absorbs the pump, the interaction with the signal beam will be much stronger than what is required. Unfortunately, this excess interaction is often accompanied by excess losses for the signal beam.

In U.S. Pat. No. 6,288,835 is described a waveguide optical amplifier with improved interaction properties between the light guided along a waveguide and the rare earth dopants within an active medium by confining said active medium being the amplifying region to a ring inside a cladding around the core of said waveguide. The regions of the ring are preferably chosen where the intensity of the signal beam is substantially smaller than its peak intensity, in a cross-section of the waveguiding device perpendicular to the direction of propagation of the signal beam. Thus, the interaction between a signal light beam and an active medium are considerably reduced without necessarily changing the properties of the gain medium or reducing the confinement of the signal light.

The pumping light is supplied by a high-power laser coupled preferably at the cladding around the core of said waveguide. The luminous energy supplied to the cladding in this way will be absorbed by the core as soon as the amplified light rays propagating in the cladding cross the interface between the core and the cladding. Obviously, the efficiency of energy pumping is mostly conditioned by the efficiency of the coupling between the core and the cladding. But a problem arises with cylindrical core/cladding interfaces, namely that some light rays conveyed by the cladding will follow a helical trajectory around the core without ever impinging on the interface. The energy conveyed by these rays is therefore injected into the cladding in vain, because it is never used to amplify the signal transported by the core.

Several solutions have been proposed to solve this problem, in particular in U.S. Pat. No. 5,949,941 and WO02/03510 by producing radial protuberances at the outer surface of the cladding comprising the active medium or designing said surface following a polygonal like shape. A clear enhancement of the mode-coupling is then achieved so that the pump power is expected to be more focused on the rare-earth doped zone. Nevertheless, for some amplifiers configurations, the power conversion efficiency is still to low to be competitive and its manufacturing may be very costly.

SUMMARY OF THE INVENTION

The object of the present invention is to design an optical fiber amplifier with an optimized power conversion efficiency between the pumping light and the signal light without implying a to costly manufacturing method.

This object is achieved in accordance with the invention for an optical fiber amplifier comprising a mono-mode core, a first cladding around said core and at least a further cladding around said first cladding while said first cladding includes a ring doped with rare earth material surrounding said mono-mode core. Advantageously, the first cladding is designed with a radial refractive index following an almost continuous decreasing function for increasing radius. The use of a continuously decreasing refractive index for the cladding at the outer border of the ring shaped active medium optimize the efficiency of the coupling between the core and the cladding. It is then, no more necessary to chose a complicated and expensive way to manufacture polygonal shape for the outer border of said first cladding.

Advantageous developments of the invention are described in the dependent claims, the following description and the drawings.

DESCRIPTION OF THE DRAWINGS

An exemplary embodiment of the invention will now be explained further with the reference to the attached drawings in which.

DETAILED DESCRIPTION OF PREFERRED EMBODIMENTS

Figure 1:
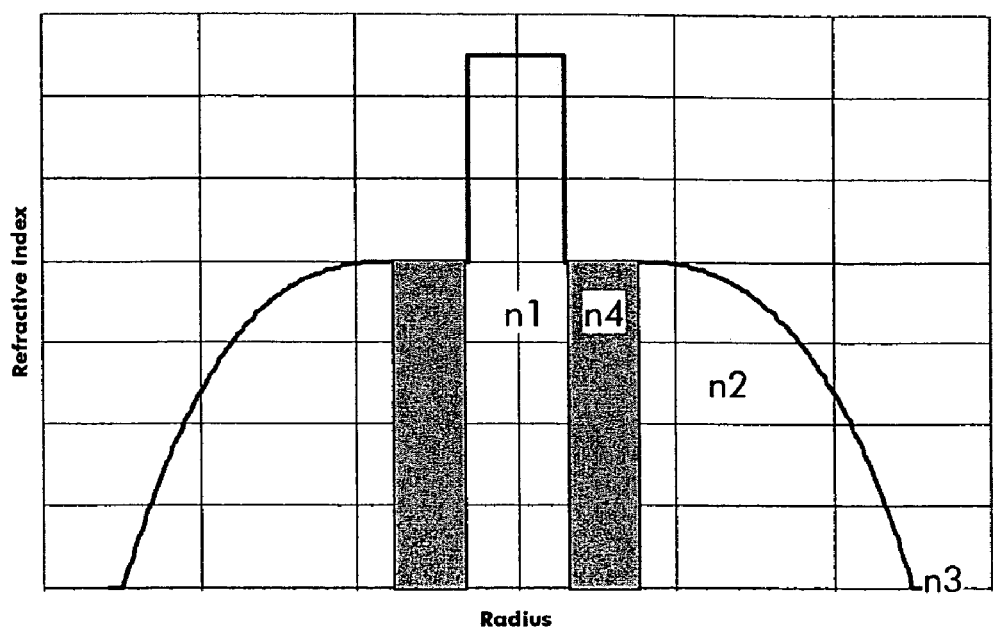
FIG. 1 illustrates an example of the distribution of the refractive index along a cross section of the core and the first cladding of an optical fiber amplifier according to the invention.

On FIG. 1 is shown a cross section of the central part of an optical fiber amplifier according to the invention. At the center of such waveguide is designed a mono-mode core with the highest refractive index n1 of the fiber. Such mono-mode core is surrounded by a first cladding with a refractive index n2 substantially lower than n1. At least a further cladding with refractive index n3 is designed around said first cladding. The active region with refractive index n4 used for pumping is defined in a ring geometry in cross section around said mono-mode core. It is obtained by doping said region with rare earth atoms like Erbium (Er) or Ytterbium (Yb).

The novelty of the present invention is to chose to fit the radial refractive index of the first cladding as a function of the radius to a continuous decreasing function as shown on FIG. 1. This will optimize the overlap between the doping region and the modes conveying the pump signal by putting more power into modes of higher propagation constant as compared with modes of lower propagation constant values which are expected to be more attenuated along the fiber by mode mixing phenomenon.

Thus, a maximum of the pumping light coupled into the active ring-shaped region with refractive index n4 will be used to amplifier signal lights transmitted through the mono-mode core with refractive index n1.

It may be preferable to chose said continuous decreasing function of the radial refractive index n2 with a negative slope. It is also of advantage to set the radial refractive index to decrease only almost at the outer border of the ring-shaped active region (n4). In that case, it is conceivable to fix the refractive index n4 of the active region substantially to some constant value possibly matching the maximum value n2_max of the radial refractive index n2 of the first cladding.

In the present case as shown on FIG. 1, the active region doped with rare earth atoms is almost directly adjacent to said mono-mode core. It is also possible to envisage that the active region in cross section ring shaped is partly included into said mono-mode core. The size of said active region is to be chosen according to the destined application. Preferably, the lower radius r1 will be chosen around 3 to 3.5 μm and the upper radius r2 around 6 μm.

When the first cladding surrounding the mono-mode core is defined with a radial refractive index n2 according to the invention, it is no more necessary to break the circular symmetry of its cross sectional outer surface as in prior art. Therefore, it is possible and preferable for a manufacturing point of view to design said first cladding substantially with a concentric outer shape.

Figure 2:
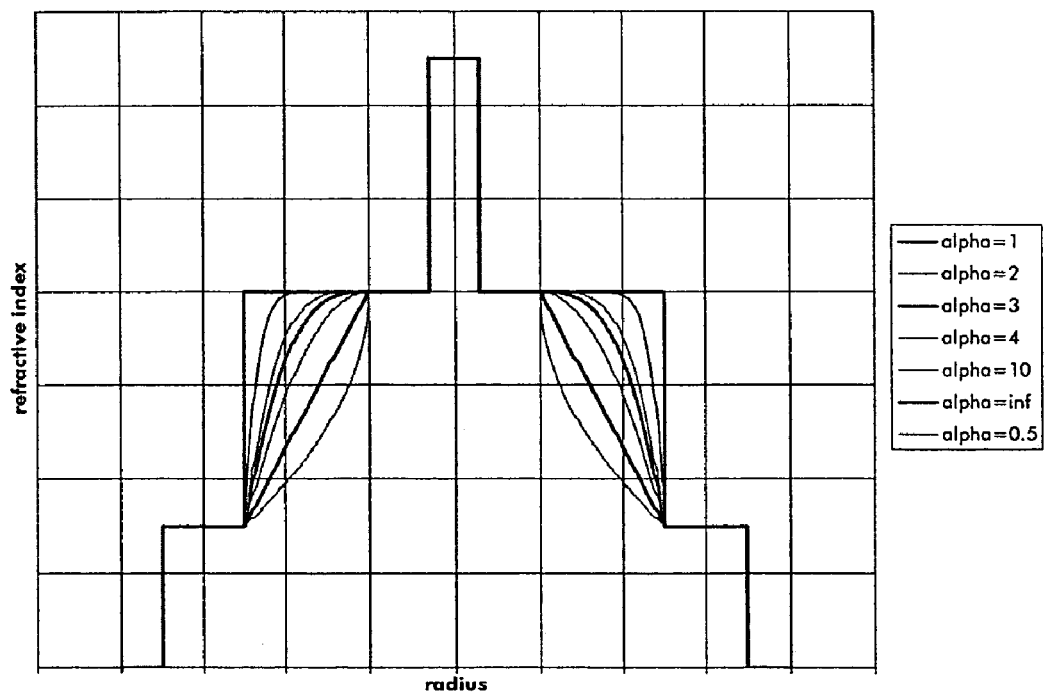
FIG. 2 illustrates several possible distributions of the refractive index along a cross section particularly of the first cladding of an optical fiber amplifier according to the invention.

It may be of advantage to choose for the radial refractive index of the first cladding a typical function used in the design of classical optical fibers for transmission of signals and defined by the following function:

$$n2(r) = n2\_max * \{1 - 2\Delta[(r-r1)/(r2-r1)]^\alpha\}$$

where $\Delta = (n2\_max^2 - n3^2)/(2*n2\_max^2)$. The radius r is defined between r1 and r2, r1 being the outer radius of the mono-mode core or the active region, and r2 the outer radius of the first cladding. The parameter α can take any value while the case $\alpha \to \infty$ is identical to the step like function (see FIG. 2) already discussed in preceding discussed prior art.

Figure 3:
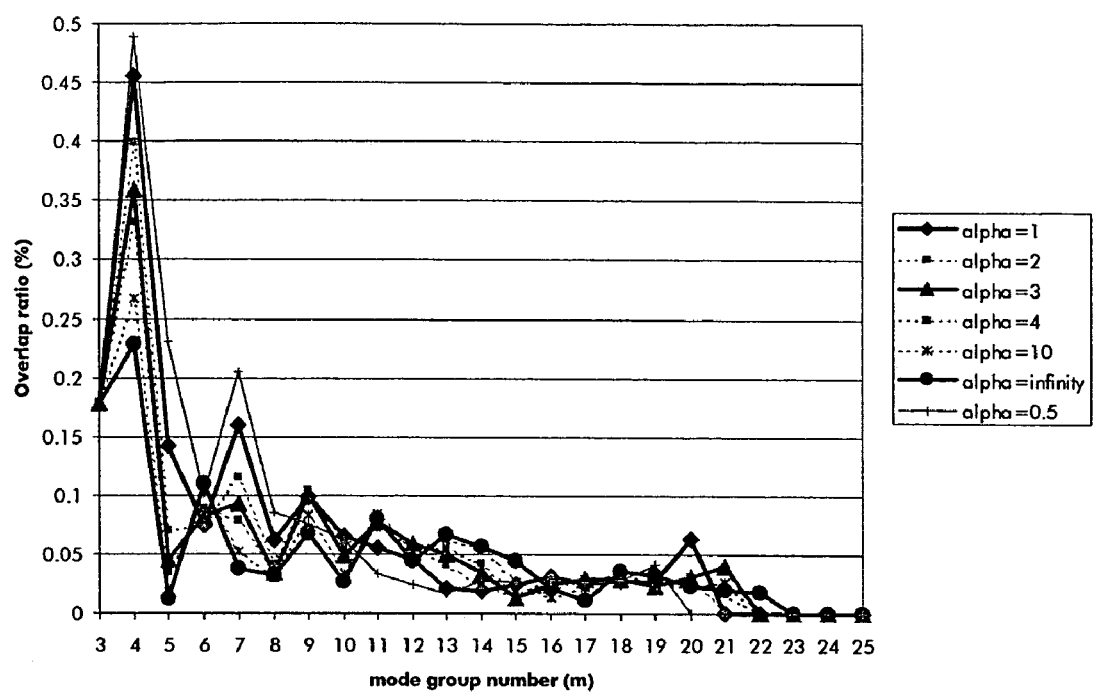
FIG. 3 illustrates different configurations of the overlap between modes in the ring-like doped region according to the invention.
Figure 4:
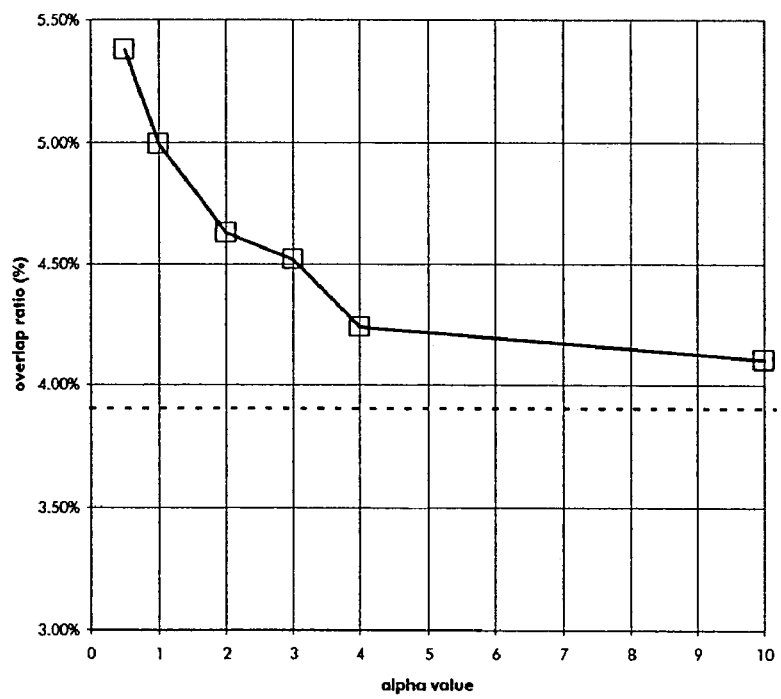
FIG. 4 illustrates the overlap property as a direct function of the slope of the radial refractive index of the first cladding according to the invention.

To fulfill the requirements of the present invention, it is necessary when using above function for n2 (r) to chose the parameter α preferably bigger than 1 e.g. α=2 or 3. On FIG. 3 is shown different results of the overlap between modes and the active ring shaped region (doped region) as a function of the mode group index. It appears clearly that there is no need of implementing an outer shape with circularly broken symmetry for mode-mixing enhancement. On FIG. 4 the overlap for the first mode is shown as function of α. The dashed line represents the asymptotic value when alpha tends to infinity. A clear higher pump power conversion efficiency when using present invention can be achieved as FIG. 4 shows a better overlap with the active region doped with rare earth atoms.

The invention claimed is:

1. Optical fiber amplifier comprising a mono-mode core with a refractive index n1, a first cladding around said core with a refractive index n2 and at least a further cladding around said first cladding with a refractive index n3 while said first cladding including in cross section a ring with a refractive index n4 doped with rare earth material surrounding said mono-mode core, wherein said first cladding shows at least part of a radial refractive index n2 as a function of the radius being substantially continuously decreasing.

2. Optical fiber amplifier according to claim 1, wherein said decreasing function is defined with a negative slope.

3. Optical fiber amplifier according to claim 1, wherein said ring shows substantially constant radial refractive index n4 while the radial refractive index n2 starts to decrease at the outer border of said ring.

4. Optical fiber amplifier according to claim 1, wherein said ring is adjacent to said mono-mode core.

5. Optical fiber amplifier according to claim 1, wherein said ring is partly included into said mono-mode core.

6. Optical fiber amplifier according to claim 1, wherein said ring is defined with a lower radius comprised around 3 μm or 3.5 μm and an upper radius comprised around 6 μm.

7. Optical fiber amplifier according to claim 1, wherein said first cladding shows an outer shape substantially concentric along the optical axis of said fiber.

8. An optical fiber amplifier comprising:
a core having a refractive index n1;
a first cladding around the core comprising an active region adjacent to the core and second region around the active region, wherein the active region has a refractive index n4, the second region has a refractive index n2 and the refractive index n2 decreases as a function of a radius of the optical fiber; and
a second cladding around the first cladding and having a refractive index n3.

9. An optical fiber amplifier according to claim 8, wherein the decrease of the refractive index n2 as a function of the radius has a negative slope.

10. An optical fiber amplifier according to claim 8, wherein the refractive index n4 is substantially constant.

11. An optical fiber amplifier according to claim 8, wherein the core is a mono-mode core.

12. An optical fiber amplifier according to claim 8, wherein the active layer has a lower radius of around 3 μm to 3.5 μm and an upper radius of around 6 μm.

13. An optical fiber amplifier according to claim 8, wherein the first cladding has an outer shape substantially concentric with the optical axis of the fiber.

14. An optical fiber amplifier according to claim 8, wherein the active region is doped with a rare earth material.

15. An optical fiber amplifier according to claim 8, wherein the refractive index n2 begins to decrease from a value substantially equal to n4.

* * * * *